(12) United States Patent
Petzold et al.

(10) Patent No.: US 8,321,109 B2
(45) Date of Patent: Nov. 27, 2012

(54) METHOD AND DEVICE FOR CONTROLLING A CLUTCH BY CLUTCH WAY POINT COORDINATE SYSTEM

(75) Inventors: Rainer Petzold, Friedrichshafen (DE); Peter Herter, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 447 days.

(21) Appl. No.: 12/602,267

(22) PCT Filed: May 27, 2008

(86) PCT No.: PCT/EP2008/056460
§ 371 (c)(1),
(2), (4) Date: Nov. 30, 2009

(87) PCT Pub. No.: WO2008/145645
PCT Pub. Date: Dec. 4, 2008

(65) Prior Publication Data
US 2010/0204010 A1      Aug. 12, 2010

(30) Foreign Application Priority Data

Jun. 1, 2007   (DE) .......................... 10 2007 025 501

(51) Int. Cl.
G06F 7/00          (2006.01)
G06F 17/00        (2006.01)
(52) U.S. Cl. .............. 701/68; 701/67; 477/80; 477/174; 192/31
(58) Field of Classification Search .................. 701/68; 477/80, 174; 192/31
See application file for complete search history.

(56) References Cited

U.S. PATENT DOCUMENTS

| | | | |
|---|---|---|---|
| 5,095,435 A * | 3/1992 | Tokoro et al. ................... | 701/68 |
| 5,337,874 A | 8/1994 | Oltean et al. | |
| 5,393,274 A | 2/1995 | Smedley | |
| 6,701,241 B2 * | 3/2004 | Senger et al. ................... | 701/67 |
| 6,966,868 B2 * | 11/2005 | Stork et al. ..................... | 477/74 |
| 7,158,873 B2 * | 1/2007 | Eich et al. ....................... | 701/68 |
| 7,300,384 B2 | 11/2007 | Eriksson et al. | |
| 7,377,374 B2 | 5/2008 | Buchhold | |
| 7,445,107 B2 * | 11/2008 | Kawamoto et al. ......... | 192/85.63 |
| 7,474,950 B2 | 1/2009 | Schwenger et al. | |
| 7,603,219 B2 * | 10/2009 | Joshi et al. ..................... | 701/68 |
| 2004/0188218 A1 | 9/2004 | Berger et al. | |

FOREIGN PATENT DOCUMENTS

| | | |
|---|---|---|
| DE | 101 38 725 A1 | 3/2002 |
| DE | 100 54 867 A1 | 5/2002 |
| DE | 102 32 495 A1 | 4/2003 |
| DE | 101 63 438 A1 | 7/2003 |
| DE | 103 06 934 A1 | 9/2004 |

(Continued)

*Primary Examiner* — Thomas Tarcza
*Assistant Examiner* — Tyler J Lee
(74) *Attorney, Agent, or Firm* — Davis & Bujold, PLLC

(57) ABSTRACT

A method and a device for controlling a clutch, for example an automatic friction clutch forming part of a drive train of a motor vehicle, for a torque transfer between an engine and a transmission, with the clutch having significant clutch way points assigned to it. For achieving the operational readiness of the clutch over the shortest possible time period, whereby an accurate clutch adjustment is still guaranteed, a clutch way point coordinate system is monitored by checking the point of engagement of the clutch, established through a learning process and having at least a relevant clutch way point for the starting procedure. In case of any recognized change(s), the clutch way point is suitably corrected or otherwise used as is.

12 Claims, 2 Drawing Sheets

FOREIGN PATENT DOCUMENTS

| | | |
|---|---|---|
| DE | 103 52 611 A1 | 6/2005 |
| EP | 0 616 142 A1 | 9/1994 |
| EP | 0 635 391 A2 | 1/1995 |
| EP | 0 725 225 A1 | 8/1996 |
| EP | 1 491 787 A1 | 12/2004 |
| WO | 2004/005744 A1 | 1/2004 |

* cited by examiner

METHOD AND DEVICE FOR CONTROLLING A CLUTCH BY CLUTCH WAY POINT COORDINATE SYSTEM

This application is a National Stage completion of PCT/EP2008/056460 filed May 27, 2008, which claims priority from German patent application serial no. 10 2007 025 501.4 filed Jun. 1, 2007.

FIELD OF THE INVENTION

The invention concerns a method and a device for a clutch control.

BACKGROUND OF THE INVENTION

In motor vehicles, with automated transmissions or automatic transmissions with an automated friction transmission as the starting drive element, several sensor data, relevant for operation, are provided to an electronic control unit, positioned between the engine and the transmission for controlling the torque transfer, such as engine rotation speed, transmission input rotation speed, drive pedal position, speed, and shift intention and, after the appropriate analysis, the engagement or the disengagement of the clutch is initiated, if necessary, having a variable level of engagement or level of disengagement.

It is known in the art to verify the individual way point conditions during the movement of the friction parts of the clutch, through learning of characteristic way points of the clutch, for achieving a perfect and comfortable start operating and shift conditions and for permanently maintaining them. As a rule, this is achieved through cyclic engagement or disengagement motions of the clutch whereby, in each case, the relevant parameters are considered, such as the idle rotation speed of the engine, being linked with the primary side of the clutch, and the transmission input rotation speed at the secondary side of the clutch, being linked with the transmission input shaft, and the way gradient when engaging the clutch. Through their pattern or course, respectively, distinct clutch way points are detected, and can be learned into or being learned, respectively.

For example, DE 103 52 611 A1 recommends a method of adoption of a clutch way point, when engaging and at the beginning of friction, through which the learning of this way point is achieved at clutch disengagement, by capturing of a difference in rotation speed between the clutch input and output side. In addition, when engaging the clutch, a second way point can be established by considering a hysteresis of the clutch way points.

In DE 100 54 867 A1, a method is presented for adopting a clutch way point, determined as a creeping point for adjusting a desired creeping torque. Hereby, the actually transmitted torque is compared to a previously configured creeping point cycle and, in case of a deviation, is adopted by a desired creeping torque when starting and engaging a gear, between a friction way point and the creeping point, defined as an assumed reference point, generating a new creeping point which corresponds with the desired creeping torque.

The EP 0 725 225 B1 describes a method for establishing a clutch way point, defined as a point of contact, in which the clutch is moving at a constant velocity, in the direction of engagement, and is engaged by capturing the rotation speed difference of a transmission shaft over time, at two positions of the engaging way points and a point of contact, ahead of the first position, is assumed.

In addition, other methods are known in the art which are not dependent on engine related sensor data or transmission input rotation speed data.

The DE 101 63 438 A1 proposes such a method for establishing a clutch application point, which is determined as a limit value in case of further engagement of the clutch and the resulting torque transfer. Here, one control parameter is varied. Particularly, the point of engagement is recognized, due to an unsteady gradient pattern of a disengagement force or due to an engagement force of the clutch which is approaching a ZERO value. The method is also applicable when the engine is being turned off.

In DE 103 06 934 A1, another method for determining the point of engagement and a beginning torque transfer is revealed, without including engine related sensor data, in which an unsynchronized reverse gear position is used. Hereby, a presently stationary vehicle with an idling engine, a point of engagement is set, when the torque transfer is sufficient enough, when being in a tooth-on-tooth position, to sliding the teeth of a sliding sleeve against a clutch body of a reverse gear wheel.

The methods in the above mentioned examples, as well as additional approaches known to those skilled in the art, for determining other needed clutch way points, especially the engaged position, meaning the fully engaged clutch position, the engagement of the clutch not having any way changes anymore, and a secure disengagement of the clutch by considering a constructional related clutch stroke, result in a clutch travel and coordinate system, or to a coordinate axis, respectively, through which certain function of the clutch can be realized, i.e., the clutch function "disengage clutch during shifting", or the clutch function "wait position when the vehicle is stationary, with a gear position selected, until starting is signaled".

It needs to be considered, when operating the clutch, that the way point settings and, therefore, also the torque transfer of the clutch might be changing over its life expectancy, especially because of wear, as well as during the actual operating and external influence, for instance varying temperature and varying rotation speed. Therefore, the learning process of the mentioned clutches is usually accomplished during each clutch stroke, or at least during each starting operation, to match the relevant clutch way points with the actual way point conditions or to adopt them, respectively. In addition, after each learning process, when the transmission is shifted to a neutral position and the engine is idling, the clutch is generally engaged and disengaged when the driver selects a starting gear position.

The known clutch control has the disadvantage in learning the clutch positions, based on the previously described function sequence, that the required time for it is relatively long and that the driver's intent for fast starting and shifting might be unnecessarily and possibly delayed.

SUMMARY OF THE INVENTION

With the above in mind, the invention is based the task for presenting a method and a device for controlling an automatic clutch which can shorten each of the needed operating conditions of the clutch, especially for starting the shift, but also guarantee a precise clutch adjustment. The latter always provides similar torque transfer conditions over the life expectancy of the clutch.

The invention is based on the knowledge that it is possible to check, in an automatic clutch based on a significant clutch way point, if decisive changes have been occurring in the clutch since the last learning cycle or operating cycle, respectively. Depending on this, a new learning process may be perhaps completely waived or single intermediate steps be skipped or shortened, whereby the clutch can often be set into an operational readiness, over a very short time.

This method avoids unnecessarily long learning times for the clutch and, therefore, enables a fast starting gear shift. This is mainly achieved through the use of the actual point of engagement, being an indicator for the validity of the entire clutch way point coordinate system, whereby a change of the clutch way point coordinate system is recognized, if the captured actual point of engagement deviates, from the last stored point of engagement, more than a previously set tolerance limit. In addition, the point of engagement is reliably determined by activating the clutch toward engagement until no way point change takes place, meaning that the clutch way point gradient is presuming at a zero value.

BRIEF DESCRIPTION OF THE DRAWINGS

For further clarification of the invention, a drawing of an exemplary embodiment is added to the specification. Herein it is shown in.

DETAILED DESCRIPTION OF THE PREFERRED EMBODIMENTS

Figure 1:
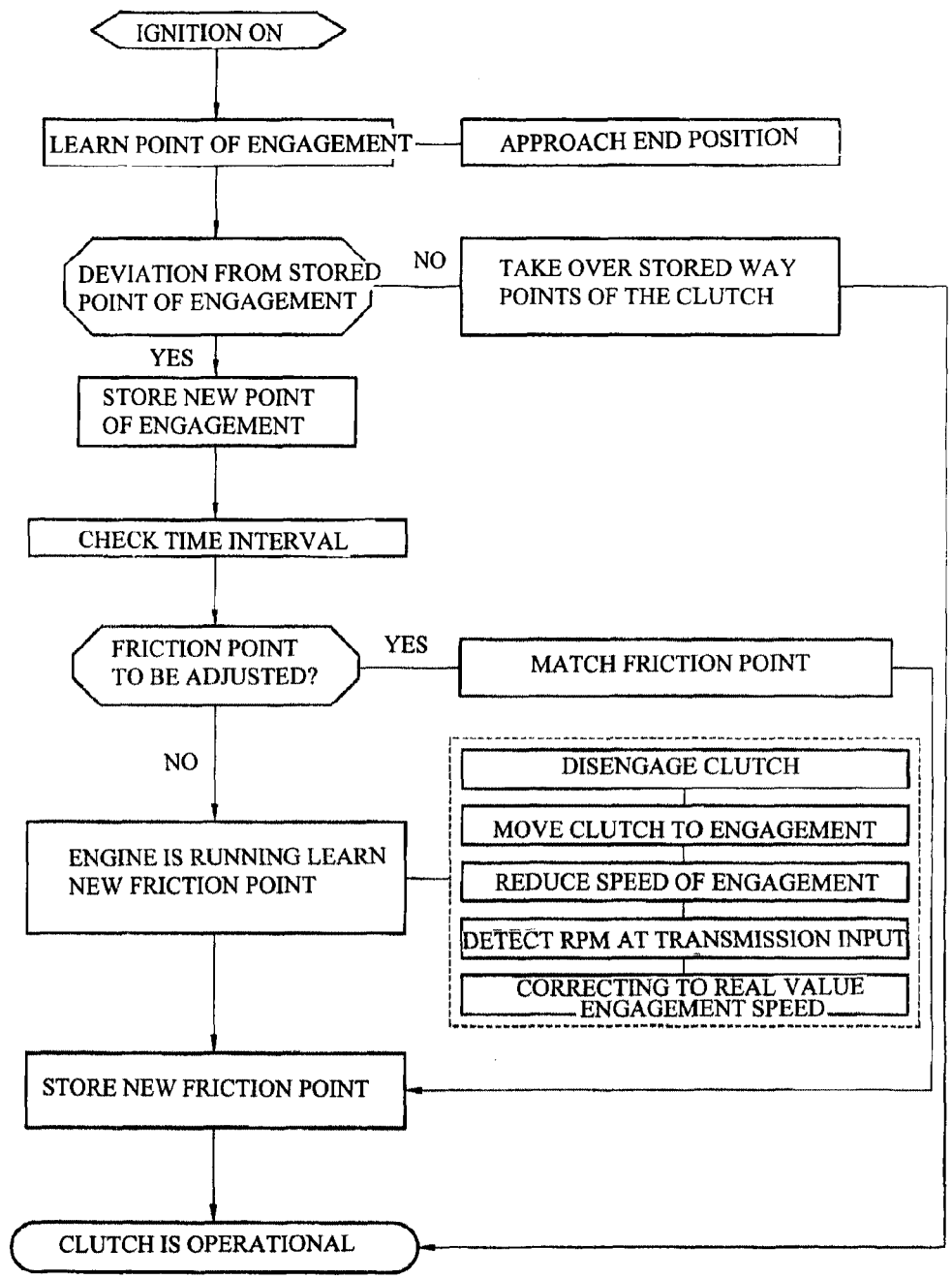
FIG. 1 a flow chart of a method for controlling a clutch.

The so called friction point in the controller unit of the clutch is of central significance, is just sufficient enough to rotate the clutch secondary side coupled to the transmission input shaft, when the friction components of the clutch are engaging. When the clutch is positioned at that point, the clutch is engaged very fast and completely, depending on the starting selection, an immediate shifting into a starting gear or, in absence of a starting intention, it is again being fully disengaged.

Therefore, an effective sequence is achieved for accelerating the learning procedure of the clutch so that:
a) After the initiating of the engine, the point of engagement is learned,
b) The learned point of engagement is compared with the last stored point of engagement,
c) In case of a deviation, of the new point of engagement from the stored point of engagement, exceeding the allowed tolerance limit,
  ca) a stored friction point is changed by the amount of the deviating value at the new time point of engagement, or
  cb) a new friction point is learned and the updated clutch way points are stored in the corrected clutch way point coordinate system, and also made available to a control unit,
  cc) apart from that, a matching is recognized between the new point of engagement and the stored point of engagement, and an immediate operating readiness is signaled.

First, when the ignition is turned on, the already engaged clutch is again activated, if necessary, toward the point of engagement or its actuator is initiated until there is no further change of the way point. It is ensured that the clutch has reached its final position, meaning that the clutch is fully engaged. The corresponding clutch position is learned. That point of time is compared with the last learned point of engagement, stored in a nonvolatile memory. When the new point of engagement and the stored point of engagement are of equal value, or are at approximately close to each other, it is assumed that there were no significant changes occurring in the clutch from the last operating cycle or the last time checking, respectively. In that case, the learning of the friction point is waived and the friction point and point of engagement of the last learned operation are used. Therefore, the clutch system is immediately available. If, however, a non-negligible deviation, between the new and the stored point of engagements, is recognized, two options are available.

First, the stored friction point can simply be moved accordingly. It requires, at least if there was just a small time period between the last operating cycle/learning cycle, to assume under a reasonable approximation that the interval between the point of engagement and the friction point are constant. Accordingly, the friction point is corrected by the value difference of the movement between the current and the new point of engagement. The advantage here is that the setting of the friction point occurs within the shortest time, whereby the entire learning process is shortened.

Second, a new friction point is learned whereby a highly accurate adjustment of the clutch is achieved. Rather this option should be performed, if a comparatively longer time period exists since the last learning cycle and/or operating cycle.

For learning a new friction point, it is advantageously provided that after starting the ignition of the engine or, in general, after activating the engine, the point of engagement is learned, followed by disengagement of the clutch, and by considering a constructively, predetermined minimal disengagement way point being disengaged, and finally the clutch, at a running engine and until exceeding a threshold at the transmission input, which is monitored as a rotation speed on the secondary side of the clutch, is moved toward the point of engagement. The newly obtained friction point is stored as a new friction point.

In series of experiments for determining the friction point, during engagement of the clutch, a surprising non-negligible effect of inertia has been shown. Hereby, under consideration of measurement errors, a linear connection is recognized, in a long clutch way point range between the detected position of the friction point and the engaging speed of the clutch, whereby the friction point moves further toward the direction of a fully engaged clutch, the faster the clutch engages. A reason for the behavior can be ascribed as that the coupling with the transmission input shaft follows, with a time delay, the friction coupling of the two parts, whereby at the time when the friction point is recognized by the rotation speed monitoring of the clutch, engagement has already advanced beyond the actual friction point. The measurements result in friction points which were considerably farther, actual friction points being positioned toward the direction of a disengaged clutch, as compared to a friction point seen without the consideration of the engaging speed.

Therefore, it makes sense to sensibly adjust learning of the friction point with regard to the engagement speed and the recognized rotational speed. The consideration of the described engaging speed dependency is advantageously achieved by reducing, at the time of engagement of the clutch, a nominal engaging speed at the time of approaching the last stored friction point. Preferably, a very low engaging speed is selected. Hereby, and not to unreasonably prolonging the learning process, the nominal speed is only reduced directly before the expected friction point, meaning before the last stored friction point. Hereby, when comparing the learning to a conventional learning process, no time disadvantage exists.

Under the above premise, the intention of positioning the clutch to a clutch way point, having a marginal torque transfer, a reduction of the engaging speed and accurate and reproducible adjustment of the clutch is achieved, when approaching the friction point and setting of a possibly low rotation speed threshold near zero value, i.e., at 5 rotations per minute, to determining the coupling with the transmission input shaft, as well as follow correction of the obtained friction point in conjunction with the captured actual engagement speed.

This learned and sensitive friction point is advantageously directly used for the clutch position having a low torque and, when learning, the clutch is immediately moved into position. Because the clutch is hereby relatively disengaged, there is no need for engagement and disengagement of a following starting gear shift, instead it serves directly as an initial position for a predetermined gear requirement or an auxiliary output shifting requirement, within a given time frame, or for an immediate converting of an existing nominal gear shifting or an auxiliary output gear shifting. This eliminates at least one clutch stroke, whereby an additional time saving is accomplished by achieving a very fast starting gear shift.

In addition, the learned friction point is used as a clutch way point, having a low torque transfer for a basic setting, when the vehicle is stationary with a gear is engaged. Depending on this friction point, the clutch can positioned, when the vehicle is stationary, for a defined resting point when the clutch is disengaged, to save the clutch during a prolonged stationary condition without a stating intention, or by activating a brake.

A device, suitable to performing the previously described invention, is presented in the disclosed embodiments of the invention.

Hereby, the invention is based on a device for controlling a clutch, i.e., an automatic friction clutch, linked with the drive train of a motor vehicle, to transfer the torque between a drive engine and a transmission, having a control unit for learning and storing of the clutch way points.

For solving the given task, the invention also addresses that the control unit is provided with means for verifying a stored clutch way point coordinate system, as well as for a position resolving varying and verifying of an engaging speed of the clutch, as well as for capturing and processing of at least one beginning rotation movement of an assigned clutch secondary side of a transmission input side.

The invented device enables very flexible handling of the learning of the clutch. On the one hand, the clutch way points, necessary for examination by the clutch control unit, are checked and the clutch way point coordinate system, if necessary, is accordingly corrected. Particularly, an engaged position of the clutch way point is verified and a friction point is matched to an engaged position, or a new independent friction point of the clutch way point is sensitively configured. On the other hand, the last stored coordinate system can also be used for enabling fast operational readiness for the clutch.

Therefore, FIG. 1 presents the sequence for establishing an operational readiness of an automatic friction clutch as part of the motor vehicle drive train. Hereby and initially, when the vehicle is stationary and the ignition is turned on, the engagement position of the activation way point of the clutch is learned. This takes place through activating the clutch actuator of an already, possibly engaged clutch, in the direction of engagement until the reaching of a final position where no further way point change takes place. The learned point of engagement is compared with the last stored point of engagement. If the new point of engagement at least approximately matches the stored way point, a new learning of the friction point is waived and the last stored clutch way point coordinate system, having the point of engagement and the friction point of the last learning process, are utilized. Immediately hereafter, the clutch moves in the state of operational readiness.

If the newly learned point of engagement differs significantly from the last stored point of engagement, the new value is stored and, depending upon the duration of time since the learning process of last operational cycle, respectively, either the last friction point is shifted by an amount of difference between the new point of engagement and the previous point of engagement or a new friction point is learned.

Figure 2:
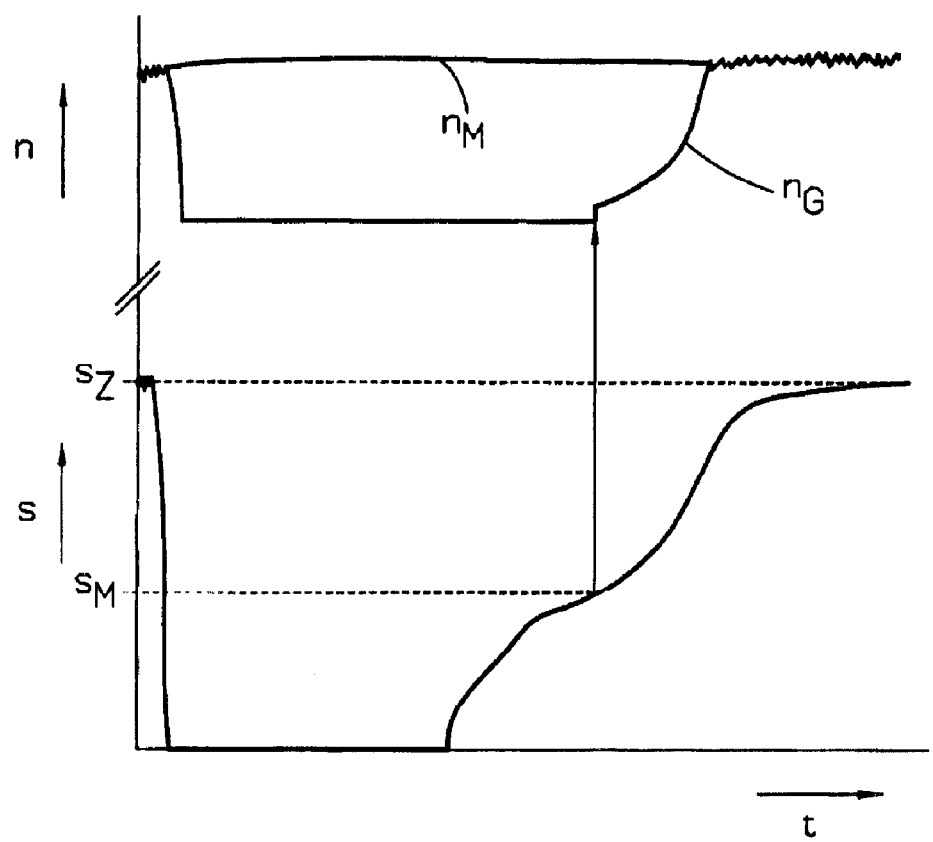
FIG. 2 a measuring chart for the purpose of a learning process on clutch way points for a clutch.

FIG. 2 shows, in the lower portion, the pattern of the clutch way point s over time t as well as, in the upper portion, a pattern of the transmission rotation speed $n_G$, during the learning process of a new friction point over time t. In addition, the fairly constant chronological sequence of the engine rotation speed $n_M$ is presented in the upper portion.

At first, the clutch is fully engaged and corresponds to the position $s_Z$ of the point of engagement. Thereafter, the clutch is fully disengaged, whereby the transmission rotation speed $n_G$ slopes down to a zero value. Thereafter, the clutch is activated in the direction of engagement. Hereby, the transmission rotational speed $n_G$ and the engaging speed of the clutch are monitored. When approaching the last stored friction point, movement of the clutch is slowed down to a lower engaging speed. This fact is presented in the chart by the temporary flattened section of the curve.

The transmission input shaft is friction coupled with the secondary part of the clutch or is starting to rotate, respectively, if the rotational speed $n_G$ at the transmission input increases along a certain grade of engagement, or the rotational speed is registered. The situation is indicated in the chart by an arrow showing the rotational speed increase of the rotational speed pattern $n_G$.

Since, as already explained, the registered friction point lags the actual friction point, the registered clutch position and the corresponding, captured actual engaging speed is compared with a stored speed characteristic curve of the friction point, and then provided with a corrected value. Herewith, the actual position $s_M$ of the new friction point is determined. After storing of the new friction point, the system is operational for a starting gear shift. This method flow is presented in FIG. 1 by the dotted line.

FIG. 2 shows, during further engagement of the clutch, that the transmission rotation speed $n_G$ eventually aligns itself with the engine rotation speed $n_M$ at the latest when reaching the position $s_Z$ of the friction point, whereby the engine rotational speed $n_M$, by means of a present idling speed controller which compensates the loss of rotational speed during the engagement and caused friction of the clutch by increasing the appropriate idling fuel injection quantity and maintaining it at a constant nominal rotational speed.

REFERENCE CHARACTERS n Rotation Speed
$n_G$ Transmission Input Rotation Speed
$n_M$ Engine Rotation Speed
s Clutch Stroke Way Point
$s_M$ Friction Position, Friction Point
$s_Z$ Engaging Position, Point of Engagement
t Time

The invention claimed is:

1. A method of controlling a clutch, which forms part of a drive train of a motor vehicle, for a torque transfer between an engine and a transmission, in which significant clutch way points are assigned to the clutch, whereby a clutch way point coordinate system, achieved through a learning process and comprising at least relevant clutch way points needed for starting gear shift, being monitored by verifying an engaging point ($s_Z$) of the clutch and, in case of a change, being one of corrected and used as measured, the method comprising the steps of:

in order to learn a new friction point ($S_M$), learning the point of engagement after starting the engine, disengaging the clutch under consideration of a constructional related minimum disengagement way point, with the engine running, moving the clutch under consideration a direction toward engagement until a transmission input, captured by a transmission speed monitoring of a transmission side secondary side of the clutch under consideration, exceeds a given rotation speed threshold, acquiring an actual engaging speed, which is the speed at which the clutch under consideration is engaged, and depending on the acquired actual engaging speed, correcting the determined friction point ($s_M$) for the clutch under consideration.

2. The method according to claim 1, further comprising the step of recognizing a changing in the clutch way point coordinate system if an actually captured point of engagement ($s_Z$) deviates from the last stored point of engagement by more than a previously determined and acceptable tolerance limit.

3. The method according to claim 1, further comprising the step of, for the purpose of learning the point of engagement ($s_Z$), assuming a value zero for the clutch way gradient when approaching a end position.

4. The method according to claim 1, further comprising the step of:

after the startup of the engine, learning the point of engagement ($s_Z$), comparing the learned point of engagement ($s_Z$) with the last stored point of engagement, when deviation of the newly learned point of engagement ($s_Z$), compared to the stored point of engagement, exceeds an acceptable tolerance limit value, one of:

modifying a stored friction point by the amount of deviation and movement of the new point of engagement ($s_Z$), learning a new friction point ($s_M$) and storing an updating clutch way point in the corrected clutch way point coordinate system and making the updating clutch way point available to a control unit, and upon recognizing a match of the new point of engagement ($S_Z$) with the stored point of engagement, signaling an immediate operational readiness.

5. The method according to claim 1, further comprising the step of, if a change of the clutch way point coordinate system is detected and if a time interval, from at least one of a last learning process and an operating cycle of the clutch under consideration, exceeds a given maximum duration of time, learning a new friction point ($s_M$).

6. The method according to claim 1, further comprising the step of, if a change of the clutch way point coordinate system is recognized and if at least one of a last learning process and a last operating cycle of the clutch under consideration exceeds a given maximum duration of time, learning a new friction point ($s_M$).

7. The method according to claim 1, further comprising the step of reducing the nominal engaging speed, during the engagement movement of the clutch under consideration, when approaching the last stored friction point.

8. The method as in claim 1, further comprising the step of presetting the rotational speed threshold close to zero rotations per minute when determining the friction point ($s_M$).

9. The method according to claim 1, further comprising the step of using the learned friction point ($s_M$) as the starting point for an expected nominal requirement or an auxiliary output initiation, within a certain time frame or an already preset nominal gearshift or auxiliary output initiation.

10. The method according to claim 1, further comprising the step of, for a basic setting in a stationary vehicle but with a gear selected, using the learned friction point ($s_M$) as the clutch way point with little torque transfer.

11. The method according to claim 1, further comprising the step of, depending upon the learned friction point ($s_M$), determining at least one additional clutch way point.

12. The method according to claim 10, further comprising the step of, depending upon the friction point ($S_M$) and considering the minimal disengagement way point, determining a resting point at which the clutch under consideration is disengaged.

\* \* \* \* \*